United States Patent [19]

Stout et al.

[11] Patent Number: 5,693,871
[45] Date of Patent: Dec. 2, 1997

[54] LOW DIFFERENTIAL PRESSURE GENERATOR

[75] Inventors: Stephen J. Stout, Titusville; Richard T. Deyoe, Palm Bay, both of Fla.

[73] Assignee: The United States of America as represented by the Administrator of the National Aeronautics and Space Administration, Washington, D.C.

[21] Appl. No.: 695,071

[22] Filed: Jul. 12, 1996

[51] Int. Cl.$^6$ ............................................. G01L 27/00
[52] U.S. Cl. ............................................. 73/1.68; 73/1.69
[58] Field of Search ................................ 73/4 R, 4 V, 3, 73/1.68, 1.69

[56] References Cited

U.S. PATENT DOCUMENTS

| | | |
|---|---|---|
| 4,542,638 | 9/1985 | Tlaker . |
| 4,576,035 | 3/1986 | Hooven et al. . |
| 4,617,826 | 10/1986 | Hagen . |
| 4,627,267 | 12/1986 | Cohrs et al. ............ 73/3 |
| 4,658,829 | 4/1987 | Wallace ................. 73/4 R |
| 4,698,997 | 10/1987 | Hess et al. . |
| 4,754,651 | 7/1988 | Shortridge et al. . |
| 4,776,201 | 10/1988 | Jones . |
| 5,347,843 | 9/1994 | Orr et al. . |

FOREIGN PATENT DOCUMENTS

| | | | |
|---|---|---|---|
| 1173694 | 3/1962 | Germany | ...... 73/4 R |
| 163378 | 6/1964 | U.S.S.R. | ........ 73/3 |

*Primary Examiner*—Robert Raevis
*Attorney, Agent, or Firm*—Beth A. Vrioni

[57] ABSTRACT

A method and apparatus for evaluating low differential pressure transducers includes a pressure generator in the form of a piston-cylinder assembly having a piston that may be manually positioned precisely within the cylinder to change the volume and thus the pressure at respective sides of the piston. At one side of the piston the cylinder communicates with a first chamber and at the other side of the piston the cylinder communicates with a second chamber, the first and second chambers being formed within a common tank by a partition wall. The chambers each communicate with the transducer to be evaluated and a standard pre-calibrated transducer, the transducers being connected fluidly in parallel so that a pressure differential between air in the two chambers resulting from movement of the piston within the cylinder is communicated to both the transducer to be evaluated and the standard transducer, and the outputs of the transducers is observed and recorded.

16 Claims, 1 Drawing Sheet

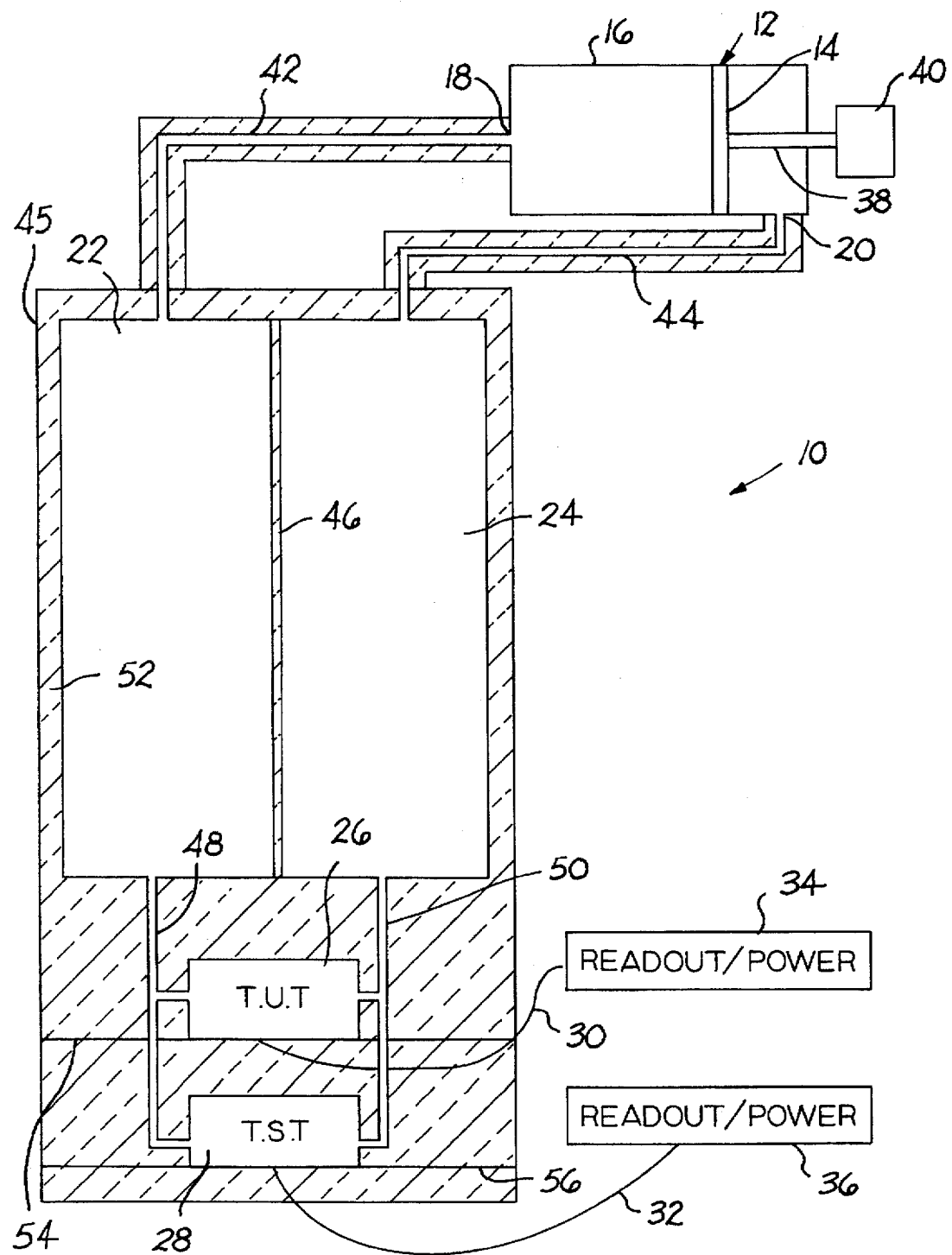

LOW DIFFERENTIAL PRESSURE GENERATOR

ORIGIN OF THE INVENTION

The invention described herein was made in the performance of work under National Aeronautics and Space Administration contract and is subject to the provisions of Public Law 96-517 (35 USC 202).

BACKGROUND OF THE INVENTION

This invention relates to a method and apparatus for generating very low differential pressures which are accurate and controllable for use in calibrating and evaluating low differential pressure transducers.

A low differential pressure between two areas such as the pressure differential between two chambers or rooms is required for certain industrial and test facilities, including semi-conductor manufacturing facilities and spacecraft processing "clean" rooms. For example, a small or low pressure differential should be maintained between clean room areas and adjacent areas which do not have to be maintained under such clean conditions. By maintaining a slight positive pressure in the clean room relative to-the adjacent areas, contaminated air will not flow from these non-clean areas into the clean room area. Under such circumstances the only source of air supplied into the clean room is controlled air flowing through the air conditioning filtration systems feeding the room.

In order to verify that the clean room is pressurized relative to the adjacent areas, pressure differential measurements must be made utilizing low differential pressure measuring transducers. Typical full scale range for these transducers is 0.1 inch of water. The known method for calibrating or testing these low differential pressure transducers has been with very expensive and cumbersome dead weight testers. Use of these testers involves strict control of room temperature and is time consuming since it requires temperature equalization. Thus, dead weight testers do not meet the requirements for performing precision testing under the various conditions required for qualification testing including temperature sensitivity and other environmental effects. Moreover, these testers cannot be used for field calibration of transducers which may be performed occasionally to avoid removal of the transducers for calibration. The advantages of these testers is that they provide the required accuracy and resolution, i.e., 0.00025 inches of water, and are considered "primary" standards. Primary standards are calibrated by the National Institute of Standards and Technology against weights that are the originating standard. Thus they are extremely accurate.

SUMMARY OF THE INVENTION

Consequently, it is a primary object of the present invention to provide a simple and inexpensive low differential pressure generator for testing and evaluating low differential pressure transducers.

It is another object of the present invention to provide an accurate and precise low differential pressure generating system that may be used for calibrating or testing low differential pressure transducers, the system being rugged and portable.

It is a further object of the present invention to provide a low differential pressure generating system which may readily produce and control the difference in pressure across a pre-calibrated standard transducer and a transducer under test so as to compare the transducer under test against the standard.

It is a still further object of the present invention to provide a testing system for accurately comparing a low differential transducer against a known standard to calibrate the transducer.

Accordingly, the present invention provides a low differential pressure generating system for evaluating low differential pressure transducers, the system including a pressure generator in the form of a volume controller for generating a controlled pressure differential between two generated pressures, one of the pressures communicating with a first port of a first chamber while the other pressure communicating with a first port of a second chamber having a volume roughly equal to that of the first chamber, each chamber having a respective second port that communicates with both the transducer under test and a known standard so that both the test transducer and the standard each are exposed to the identical pressure differential. By adjustment of the volume controller, a desired differential pressure can be obtained as determined by the electrical output of the standard, and the electrical output of the transducer under test may be recorded so as to calibrate the transducer relative to the standard for this pressure differential.

In the preferred embodiment, the volume controller may comprise a piston-cylinder assembly that has a threaded piston rod which may be manually positioned precisely within the cylinder and as the volume in the system at one side of the piston increases, the volume in the system at the other side of the piston decreases by an equal amount. The volume differential is reflected in the pressure differential across the transducer and the standard.

Also in accordance with the preferred embodiment, both chambers may be in a common tank partitioned to form the two chambers, and the system may be easily insulated and may be readily portable.

BRIEF DESCRIPTION OF THE DRAWINGS

The particular features and advantages of the invention as well as other objects will become apparent from the following description taken in connection with the accompanying drawings, in which:

The sole figure is a diagrammatic view of a low pressure differential pressure generating system for evaluating low differential pressure transducers constructed in accordance with the present invention.

DESCRIPTION OF THE PREFERRED EMBODIMENT

Referring now to the drawing, a differential pressure generating system for evaluating or calibrating differential pressure transducers according to the present invention is illustrated at 10, the system comprising a volume controller 12 in the form of a piston-cylinder assembly including a piston 14 disposed within a cylinder 16 having two ports 18, 20 at respective ends of the cylinder which communicate with respective chambers 22, 24. Also communicating with the chambers 22, 24 is the differential transducer under test (T.U.T) 26 and a transfer standard transducer (T.S.T.) 28, the transducer 26 and the standard 28 being connected fluidly in parallel with the chambers 22, 24 and thus the volume controller 12. That is, one side of both the transducer 26 and the standard transducer 28 communicate with chamber 22 and the other side of both communicate with chamber 24. Thus, any differential pressure between the two chambers is reflected across both the test transducer and the standard transducer. The transducer 26 and the standard transducer 28 are electrically connected by electrical leads 30, 32 to separate respective readout, power and recording devices 34, 36 which may include digital displays.

The volume controller 12 has a rod 38 fastened to the piston 14, the rod extending out of the cylinder 16 and having a manually engagable handle or knob 40 at its exterior end. Either the piston 14 or the rod 38 may be threaded into the cylinder so that upon manual rotation of the handle 40, the piston 14 can be located precisely within the cylinder 16. This allows the gas volume at one side of the piston to be increased while decreasing the volume at the other side by substantially an equal mount. A precision volume controller of this type having the rod 38 threaded into the cylinder, is manufactured by Heise Division of Dresser Industries, Inc. of Stratford, Conn. A similar type of device is also illustrated in Hagen U.S. Pat. No. 4,617,826. Small conduits such as tubes 42, 44 communicate the respective ports 18, 20 with ports or openings in the cylinders 22, 24. Thus, volume changes of air in the volume controller 12 results in equivalent volume changes in the chambers 22, 24 at the respective sides of the piston. When the piston is closer to the rod end of the cylinder 16, the volume of gas in the cylinder at the piston face end of the cylinder is greater than that of the volume at the rod end of the cylinder as illustrated in the figure. When the piston is moved to the left, as illustrated in the figure, the pressure in the chamber 22 is increased relative to the pressure in the chamber 24, and when moved in the opposite direction the reverse occurs.

The chambers 22, 24 are formed in a cylindrical tank 45 preferably constructed from stainless steel, a partition wall 46 being welded along its entire length in the tank to form the separate chambers 22, and 24. It is expected that the height of the chambers will be in the order of approximately 18 inches while the diameter of the tank will be in the order of approximately 12 inches. Since the chamber 22 communicates with the piston face end of the cylinder 16 the gas volume, i.e., air volume, in the system including the chamber 22 initially may be equal to, less than or greater than the gas volume in the system depending upon the initial location of the piston 14 in the cylinder 16 including the chamber 24. At this time the differential pressure is zero since the system is at ambient pressure. When the piston 14 is moved a pressure differential is effected between the chambers 22, 24. This pressure differential is utilized to evaluate the transducer under test against the standard.

Tubing 48 communicates the chamber 22 with one side of the test transducer 26 and one side of the transfer standard transducer 28, and tubing 50 communicates the chamber 24 with the other sides of the test transducer and the standard. The system is otherwise sealed or closed. Additionally, the tubes 42, 44, the tank 45 and the tubing 48, 50 preferably are insulated by foam insulation or the like 52 to ensure that heat transfer from the room does not result in differing amounts of heat flowing to each side of the system.

To evaluate or calibrate the transducer 26 requires it to be compared to a standard. In order to do this accurately in the field or on site, the transfer standard 28 must be a highly accurate and precise transducer which provides an accurate read out at the device 36. The calibration of the transfer standard is performed against a "primary" standard in a calibration laboratory or the like under controlled conditions. Such a transfer standard may be calibrated to an accuracy which gives the system the overall accuracy necessary for qualification testing and for field variations. The transfer standard that provides this required accuracy must therefore be a precision measurement system. One such system is a Baratron Model 698 Delta P measuring system manufactured by M. K. S. Instruments, Inc. of Andover, Mass. which provides a digital output that may be displayed and recorded by a computer. In operation, the operator will adjust the volume controller 12 by rotation of the knob 40 while observing the reading of the transfer standard at the display 36. When the desired pressure differential is obtained, the operator may record the reading from the standard transducer 28 and the transducer being evaluated. The readings preferably are a digital read out, and the recording may be accomplished with the use of the computer. Since a temperature increase occurs when the volume of a closed chamber is increased, the temperature and pressure changes are communicated rapidly to the air in the chambers 22 and 24. The slight increase in temperature is slowly conducted to the chamber wall over a relatively long period of time. Heat is also transferred through the partition wall 46 until the two volumes are at the same temperature. The heat transfer processes are relatively slow and the effect of the volume controller is substantially fast enough for the operator to easily maintain the pressure differential during the test operation since the increase in pressure resulting as the temperature decreases is relatively slow. The operator may make small volume changes constantly to maintain a pressure difference between the two chambers to within 0.00005 inches of water. Initial testing of the method has illustrated that repeatable results to within 0.3 percent full scale may be provided.

It may be noted that the apparatus may be placed within a portable insulated container and the weight thereof would be in the order of 40 to 50 pounds. In this case the transducer 26 and the standard transducer 28 may be mounted on respective shelves 54, 56. If desired, however, the system may be used with the transducer under test located in a temperature and humidity chamber spaced from the remainder of the system.

Numerous alterations of the structure herein disclosed will suggest themselves to those skilled in the art. However, it is to be understood that the present disclosure relates to the preferred embodiment of the invention which is for purposes of illustration only and not be construed as a limitation of the invention. All such modifications which do not depart from the spirit of the invention are intended to be included within the scope of the appended claims.

Having thus set forth the nature of the invention, what is claimed herein is:

1. A method for calibrating low differential pressure transducers comprising:

(a) providing a closed gas .fluid system including a pair of adjacent chambers of substantially equal physical volumes, each chamber having a first port and a second port, (b) increasing the pressure of gas in one of the chambers while simultaneously decreasing the pressure of gas in the other of said chambers by feeding gas through the first port of said one chamber and expelling gas through the first port of the other chamber so as to provide a differential gas pressure between the second ports of said chambers, (c) placing a transducer to be calibrated and a standard pre-calibrated transducer at a respective location relative to said second ports permitting each transducer to be exposed to said differential gas pressure, (d) obtaining a signal from said standard pre-calibrated transducer in response to the pressure differential, and (e) obtaining a signal from said transducer to be calibrated in response to said pressure differential.

2. A method for calibrating low differential pressure transducers as recited in claim 1, wherein the pressure in said chambers are adjusted until the signal from the standard pre-calibrated transducer corresponds to a desired pressure differential of the gas between the second ports of said chambers, and then recording the signal from the transducer to be calibrated.

3. A method for calibrating low differential pressure transducers as recited in claim 1, wherein said transducer to be calibrated and said standard pre-calibrated transducer are fluidly connected in parallel.

4. A method for calibrating low differential pressure transducers as recited in claim 1, wherein the pressure increase in said one chamber is accompanied by a substantially equal decrease in pressure in said other chamber.

5. A method for calibrating low differential pressure transducers as recited in claim 4, wherein the pressure in said chambers are adjusted until the signal from the standard pre-calibrated transducer corresponds to a desired pressure differential of the gas between the second ports of said chambers, and then recording the signal from the transducer to be calibrated.

6. A method for calibrating low differential pressure transducers as recited in claim 1, wherein said fluid system includes a cylinder having a piston including two sides movable therein, a fluid line communicating said cylinder at one side of said piston with said one chamber and a fluid line communicating said cylinder at the other side of said piston with said other chamber, said increasing of the pressure in said one chamber and decreasing of the pressure in said other chamber comprising moving said piston a controlled amount.

7. Apparatus for calibrating low differential pressure transducers comprising, a closed fluid system including a transducer to be calibrated and a standard precalibrated transducer each having an electrical output when exposed to a pressure differential, a pair of chambers, each chamber having a respective first port and a respective second port, a cylinder having two ends and including a piston therein, a rod secured to said piston and extending out the exterior of said cylinder, means on said piston rod for moving said piston controlled amounts selectively relative to said cylinder, conduit means communicating one end of said cylinder to the first port of one of said chambers, conduit means connecting the other of said cylinders to the first port of the other of said chambers, movement of said piston thereby increasing the volume in the interior of said cylinder at one side of the piston and reducing the volume at the other side of said piston thereby resulting in a pressure differential between said chambers, means communicating said second port of each chamber with each of said transducer to be calibrated and said standard pre-calibrated transducer such that each of said transducers is exposed to said pressure differential, whereby the output from said transducer to be calibrated may be compared to the output of said standard transducer at selected pressure differentials.

8. Apparatus for calibrating low differential pressure transducers as recited in claim 7, wherein said piston rod is threadedly mounted relative to said cylinder.

9. Apparatus for calibrating low differential pressure transducers as recited in claim 8, wherein said chambers comprise a tank having a partition wall for dividing said tank into substantially equal volumes.

10. Apparatus for calibrating low differential pressure transducers as recited in claim 9, wherein said tank is thermally insulated about said chambers.

11. Apparatus for calibrating low differential pressure transducers as recited in claim 7, wherein said chambers comprise a tank having a partition wall for dividing said tank into substantially equal volumes.

12. Apparatus for calibrating low differential pressure transducers as recited in claim 11, wherein said transducer to be calibrated and said standard transducer are fluidly connected in parallel.

13. Apparatus for calibrating low differential pressure transducers as recited in claim 12, including means for measuring and recording the outputs from said transducer to be calibrated and said standard transducer.

14. Apparatus for calibrating low differential pressure transducers as recited in claim 11, wherein said tank is thermally insulated about said chambers.

15. Apparatus for calibrating low differential pressure transducers as recited in claim 7, wherein said transducer to be calibrated and said standard transducer are fluidly connected in parallel.

16. Apparatus for calibrating low differential pressure transducers as recited in claim 7, including means for measuring and recording the outputs from said transducer to be calibrated and said standard transducer.

* * * * *